United States Patent [19]
Giessmann et al.

[11] Patent Number: 5,202,561
[45] Date of Patent: Apr. 13, 1993

[54] DEVICE AND METHOD FOR ANALYSING IONS OF HIGH MASS

[75] Inventors: Ulrich-Peter Giessmann, Bremen; Franz Hillenkamp, Münster; Michael Karas, Münster-Roxel, all of Fed. Rep. of Germany

[73] Assignee: Finnigan GmbH, Bremen, Fed. Rep. of Germany

[21] Appl. No.: 707,881

[22] Filed: May 31, 1991

[30] Foreign Application Priority Data

Jun. 13, 1990 [DE] Fed. Rep. of Germany ....... 4019005

[51] Int. Cl.⁵ .......................... B01D 59/44; H01J 49/00
[52] U.S. Cl. ....................................... 250/281; 250/283; 250/287
[58] Field of Search .......................... 250/281, 283, 287

[56] References Cited

U.S. PATENT DOCUMENTS

| Re. 33,344 | 9/1990 | Stafford et al. | 250/281 |
| 3,898,456 | 8/1975 | Dietz | 250/283 |
| 4,267,448 | 5/1981 | Feser et al. | 250/283 |
| 4,423,324 | 12/1983 | Stafford | 250/294 |
| 4,766,312 | 8/1988 | Fergusson et al. | 250/283 |
| 4,810,882 | 3/1989 | Bateman | 250/283 |
| 4,835,383 | 5/1989 | Mahoney et al. | 250/281 |
| 4,988,867 | 1/1991 | Laprode | 250/281 |
| 4,988,868 | 1/1991 | Gray | 250/281 |
| 4,996,422 | 2/1991 | Mitsui et al. | 250/283 |

FOREIGN PATENT DOCUMENTS

| 281413 | 9/1988 | European Pat. Off. . |
| 1410315 | 10/1975 | United Kingdom . |
| 2233147 | 1/1991 | United Kingdom . |

Primary Examiner—Bruce C. Anderson
Attorney, Agent, or Firm—Flehr, Hohbach, Test, Albritton & Herbert

[57] ABSTRACT

Detector device for analysing ions of high mass using a time-of-flight (TOF) analytical method, consisting of a mass spectrometer 1, accelerating electrodes 2 and a magnetic field and/or electric field, all of which serves to deflect secondary ions 5 emerging from a first conversion dynode 8, so that the secondary ions impinge according to polarity on a second 7 and third 7' conversion dynode.

4 Claims, 4 Drawing Sheets

DEVICE AND METHOD FOR ANALYSING IONS OF HIGH MASS

The present invention relates to a device and a method for analysing ions of high mass using a time-of-flight (TOF) analytical method. Both positively and negatively charged ions are located in the primary ion beam of the spectrometer. In particular, this spectrometer is suitable for the analysis of heavy- primary ions, such as can occur, for example, in the case of organic ions having relatively high molecular weights.

BACKGROUND OF THE INVENTION

A similar device for the alternative detection of positively and negatively charged ions at the output of a mass spectrometer is presented in German Patent 2,825,760. With this device, a rapid switch-over can be performed for the alternative measurement of positively and negatively charged ions, since all that is required is to reverse the polarity of the voltage at the conversion dynode or conversion electrode Spectra of an identical sample of positively and negatively charged ions can be recorded alternately with such a device.

As a rule, spectrometers for analysing positively and negatively charged ions consist of a secondary electron multiplier, whose first dynode separates ions coming from a mass spectrometer. In this case, the first dynode is connected to a potential in the kilovolt range, so that the ions emerging from the mass spectrometer are accelerated through the electric field, and can trigger secondary processes as a result of the kinetic energy absorbed.

It is known from the International Journal of Mass Spectrometry and Ion Processes, 69 (1986), pages 233-237 that when impinging on surfaces organic ions having a kinetic energy of a few keV can, apart from electron emission, also cause ion emission. This phenomenon is used in various mass spectrometers for the purpose of detecting negative ions by firstly directing the latter onto a so-called conversion dynode, from which positively charged secondary dary ions of different origin are then accelerated onto the secondary electron multiplier, in order to liberate electrons there in a known way. Such methods for analysing ions of high mass are presented and described in the printed publications DE 2,825,760, U.S. Pat. No. 4,423,324 and U.S. Pat. No. 4,810,882.

Moreover, the literature contains numerous papers on SID (Surface Included Dissociation), a technique in which complexes of organic primary ions with surfaces of characteristic secondary ions (fragments), the subsequent mass analysis of which is used for the structural resolution of the primary ions, are produced by impact processes.

All previously known mass spectrometric detector arrangements with so-called postacceleration have the aim of enhancing the detection sensitivity for high masses through an improved secondary electron yield. Normally, for this purpose the ions separated in the mass spectrometer are accelerated to a typically 20-30 keV before impinging on the electron-liberating surface. This electrode, which is also termed a conversion dynode, is connected such that in the case of negative primary ions, positive secondary ions, and in the case of positive primary ions, negative secondary ions/electrons are accelerated towards the secondary electron multiplier (SEM). If a photocathode is further connected upstream of the secondary electron multiplier, negative primary electrons are accelerated onto an electrode, from which electrons are then liberated, since photocathodes react only in this way.

So far, the secondary ions have been accelerated directly onto the first dynode or the front side of a so-called microchannel plate in order to liberate electrons there.

In such a design, when there is a change in the potential of this electrode the energy of the secondary particles entering the secondary electron multiplier is also automatically changed as well, or its polarity is determined. This detector arrangement is, however, only to be used for a limited field of application.

Hillenkamp laser desorption has for the first time made accessible an analysable mass range for biomolecules above 50,000 daltons Until recently, there was no method which would have permitted proteins with a molecular weight of 200 to 300,000 daltons to be ionised intact.

Furthermore, it has been established in extensive experiments that when such macromolecules having a kinetic energy of a few 10 keV impinge ions of both polarities are ejected. The emission rate of electrons is comparatively very low. Thus, for these macromolecular ions the detection signal is mainly caused by secondary ions and not by secondary electrons which are alone responsible for the detection of the primary ions, are emitted from the conversion dynodes normally used. In this primary step, electrons are of only secondary importance for detection.

However, for primary ions larger than 3,000 daltons and in the range of kinetic energy from 10 to 50 keV none of the abovementioned detector devices has yet delivered a satisfactory yield of secondary electrons for a satisfactory signal.

OBJECT AND SUMMARY OF THE INVENTION

It is therefore the object of the present invention to enhance the detection sensitivity and accuracy for ions of high mass by employing simple and cost effective means.

This object is achieved according to the invention when the detector device for analysing ions of high mass using a time-of-flight (TOF) analytical method is fitted with a mass spectrometer, accelerating electrodes and a magnetic field and/or electric field, all of which serves to deflect the secondary ions emerging from a first conversion dynode, so that the secondary ions impinge according to polarity on a second and third conversion dynode, respectively.

The invention is based on the novel finding that with larger primary ions starting from approx. 3,000 daltons and ion energies in the range from 10 to 50 keV, increasingly more secondary ions (mass range up to approximately 200 daltons) and ever fewer secondary electrons are produced at a conversion dynode of a secondary electron multiplier or a multi TM channel plate in the case of increasing mass or decreasing energies Consequently, a second conversion of these secondary ions into electrons must further be performed for a conventional, efficient amplification of the signal.

When using a time-of-flight (TOF) analyser, which is earmarked as a simultaneous spectrometer for the laser desorption of biomolecules and covers an unlimited mass range, a broadening of the ion signal is observed, which is caused by different transit times of the various secondary ions, emitted from the first conversion dynode, on the path to the secondary electron multiplier, mass selection by magnetic or electric fields appearing as an advantageous solution with a low technical outlay. Consequently, in the case of mass-independent initial energies of the emitted secondary ions, a permanent magnetic field can be applied between the first and the second or third conversion dynode and the desired mass can be set by changing the extraction voltage.

Magnetic deflection of electrons from a baffle plate onto a microchannel plate is described in the literature as a detector arrangement for a time-of-flight analytical method, but without a mass range of secondary ions having been stopped out via a slit. The use of an electric deflecting field or retarder is suggested if the energy of the emitted secondary ions is mass-dependent.

As mentioned above, because of their distribution over a substantial mass range, on the path from the first to the second conversion dynode the secondary ions suffer a time dispersion which leads to temporal smearing of the signal and thus to loss of mass resolution. This loss of resolution can advantageously be compensated with an electronic compensation method, by firstly separating the secondary ions according to their masses in an electric or magnetic field, which can be done, for example, by means of a slit for detecting only a narrow mass range or only a specific mass.

The secondary ions separated by the electric or magnetic field are then detected using a row detector or another so-called array detector In terms of time, the signals of the individual elements of the detector are now delayed electronically with respect to one another and summed up in such a way that all secondary ions can be used for detection, the transit time dispersion being, however, compensated electronically.

Furthermore, by means of a grid, which is arranged before the first conversion dynode and is at the same potential as the conversion dynode, and of a suitable shape for the electrode the field between the two conversion dynodes is optimised due to the fact that a high field strength prevails between a short distance of the two conversion dynodes. Consequently, the transit time of the ions can be determined. A further advantage of this invention is to be seen in that by applying pulsed voltages primary or secondary ions are transmitted only as long as—after recording a general spectrum—primary ions of a specific species impinge on the first conversion dynode. In this way, all the secondary ions can be summed up, and yet only the signal of a specific mass is obtained. However, separate laser shots must be summed up for each mass.

In optimising the number of secondary ions of opposite polarity to the primary ions, which can be achieved, for example, by suitable selection of a surface coating of the conversion dynode, a signal can be tapped directly from the conversion dynode in conjunction with effective stripping of all secondary ions This signal can then be further differentiated, as required It is therefore sensible on the basis of the above-mentioned novel findings with regard to the varying energies with increasing mass of the ions at a conversion dynode to connect a second electrode between the original conversion dynode and the secondary electron amplifier, which permits negative or positive secondary ions to be stripped by selecting the potential difference with respect to the first dynode, and on whose surface subsequent secondary processes can then take place. Detection of the high-molecular primary ions can be optimised by the additional electrode and matched to the specific analyser requirements When a photomultiplier, for example, is used the required electrons can be liberated at this electrode and accelerated towards the scintillator.

Further advantageous embodiments of the present invention are given in the subclaims.

BRIEF DESCRIPTION OF DRAWINGS

Preferred embodiments will be explained in more detail with reference to the drawings, wherein.

DETAILED DESCRIPTION AND PREFERRED EMBODIMENTS

Figure 1:
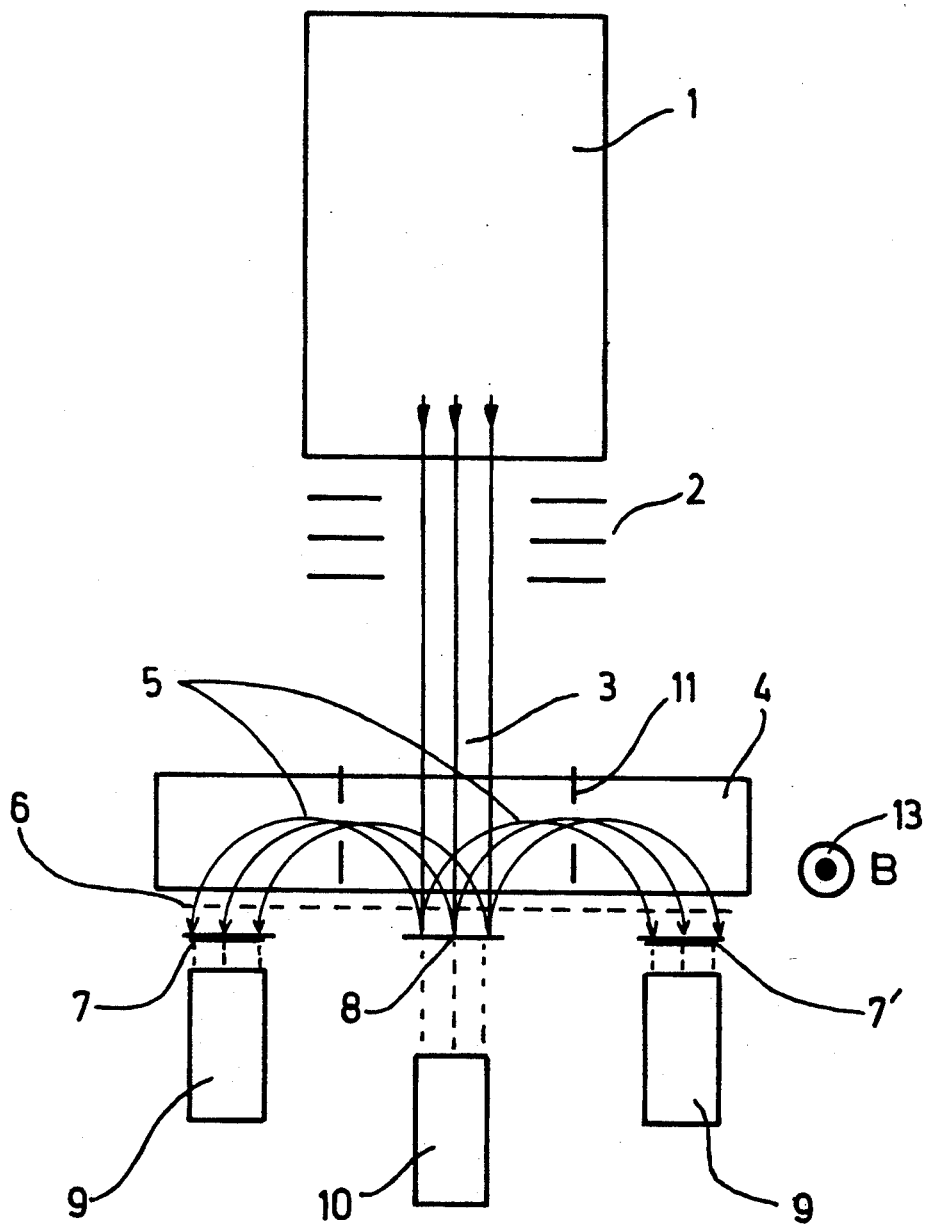
FIG. 1 shows a diagrammatic representation of a detector device for analysing ions of high mass.

A diagrammatic representation of a detector device for analysing ions of high mass is to be seen in FIG. 1. Here, 1 denotes a mass spectrometer which, in the case of ions of high molecular weight, preferably consists of a time-of-flight analyser Connected downstream of the mass spectrometer in the direction of the primary beam is a focusing device 2 which essentially consists of a plurality of accelerating electrodes Here, the primary ions 3 of both polarities emerging from the mass spectrometer 1 are accelerated to a primary energy and directed onto a first conversion dynode 8. The particles transmitted from the first conversion, dynode 8 are accepted by a secondary electron multiplier 10 arranged in the direction of radiation, and converted into an electrical signal.

The impingement of the primary ions on the primary beam 3 onto the first conversion dynode 8 produces processes here which generate so-called secondary ions 5 of both polarities. The ions thus produced are collected and accelerated by a draw-out electrode 6, as a result of which they pass into a magnetic field region 4 of field strength between 0 and 300 gausses. Due to the different exertion of force with respect to the direction of the different polarities of the ions, the ions generated are separated into virtually two ion groups of tracks 5. In order to keep the divergence of these tracks within bounds, an aperture 11, which focuses the beams to a certain extent, is arranged between the first conversion dynode 8 and the second or third conversion dynodes 7 and 7'.

The desired mass or mass range can be set by changing the extraction voltage at the draw-out electrode 6.

The particles generated at the second 7 or third 7' conversion dynode are then measured in each case in separate secondary electron multipliers 9, and their electrical signals combined to form a spectrum.

Figure 2:
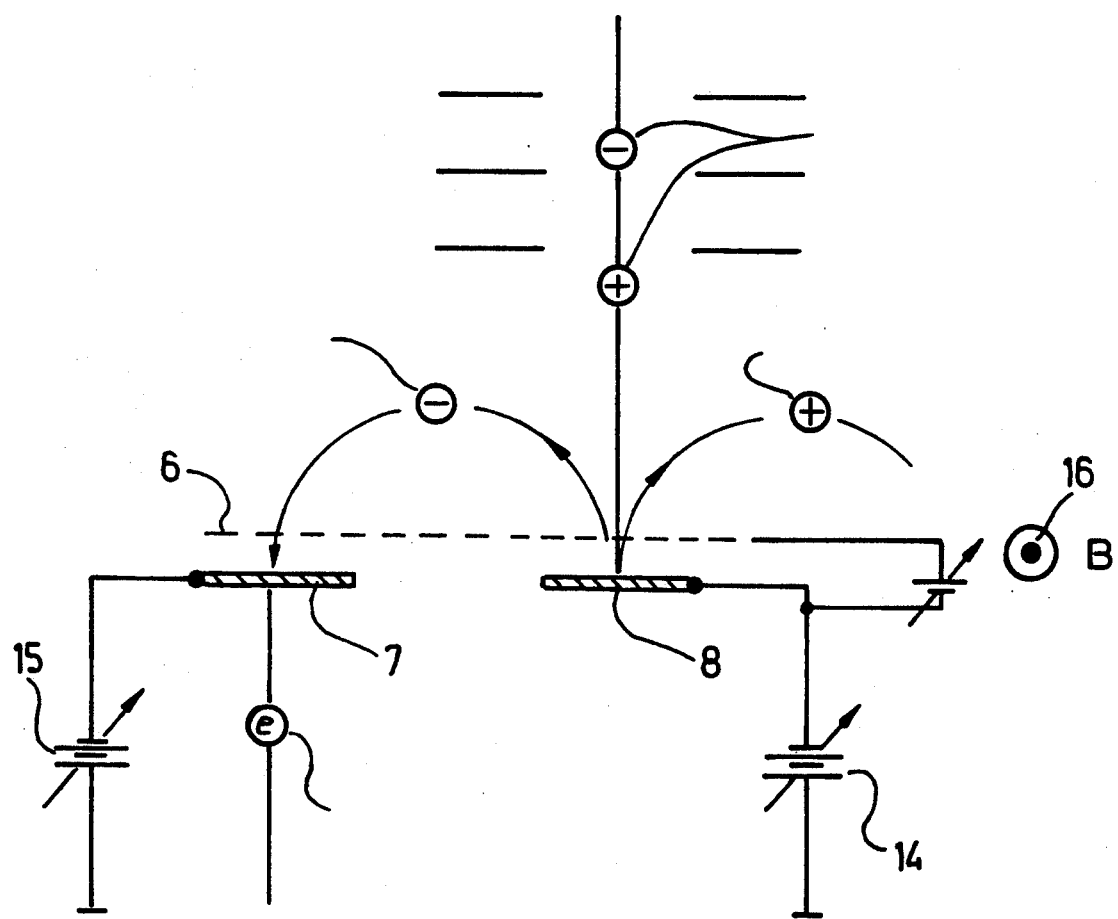
FIG. 2 shows the principle of the construction of a detector device for analysing ions of high mass, the principle of the arrangement of the different electrical potentials being represented by way of illustration.

The construction to be seen in FIG. 2 is the same in principle as that in FIG. 1, although for reasons of clarity the electrical potentials of the individual elements are drawn in, as well. Here, the conversion dynode 8 is connected to a first controllable voltage source 14, which can have a relatively high internal resistance, since the current required here is very small. A further controllable D.C. voltage source 16 serves to impress a potential onto the draw-out electrode 6, in order to draw-out the ions generated from the surface of the conversion dynode 8, i.e. to accelerate them, in order then to separate them depending on polarity with the aid of the magnetic field. The negative or positive secondary ions pumped off are then directed onto a second conversion dynode 7, which is likewise connected to a controllable high-voltage source 15.

The electrons that are generated here on this conversion dynode 7 and emerge then pass into the secondary electron multiplier 9 provided for the purpose, which outputs an electrical signal for further processing and analysis.

The same holds mutatis mutandis, for the positive charge, not represented in the figure, of the secondary ions, which due to the action of the force of the magnetic field travel in precisely the opposite direction to the direction of the negatively charged secondary ions It is thus possible by means of the additional electrode to optimise detection of the high-molecular primary ions and match it to the specific analyser requirements It is preferable for the purpose of recording the spectra to be investigated to use a time-of-flight analyser, which is earmarked as a simultaneous spectrometer for the laser desorption of biomolecules, since the mass range of the ions that is to be measured and investigated is virtually unlimited The principle of a time-of-flight spectrometer is based on measuring a time interval which a particle requires to traverse a specific distance, and thus represents a measure of the velocity Since the kinetic energy of a particle is correlated with the mass and the velocity of this particle, a precise determination of the kinetic energy or of the mass can be achieved from the measurement of the flight distance and flight time. In order to realise this spectrometer principle it is necessary to determine both the instant of the take-off at the start of the flight distance and the instant of the arrival at the end of this flight distance with satisfactory small time uncertainty. Since both the flight time and the flight distance can be measured very accurately, the ratio of the flight time to the flight distance is a measure of the energy resolution of the spectrometer. Depending on the magnitude of the two parameters, the measuring accuracy can be freely selected within certain limits.

Thus, with the aid of modern electronics the signals of the individual elements of the detector device can be processed temporarily such that any time dispersion possibly occurring can be compensated with satisfactory accuracy.

Figure 3:
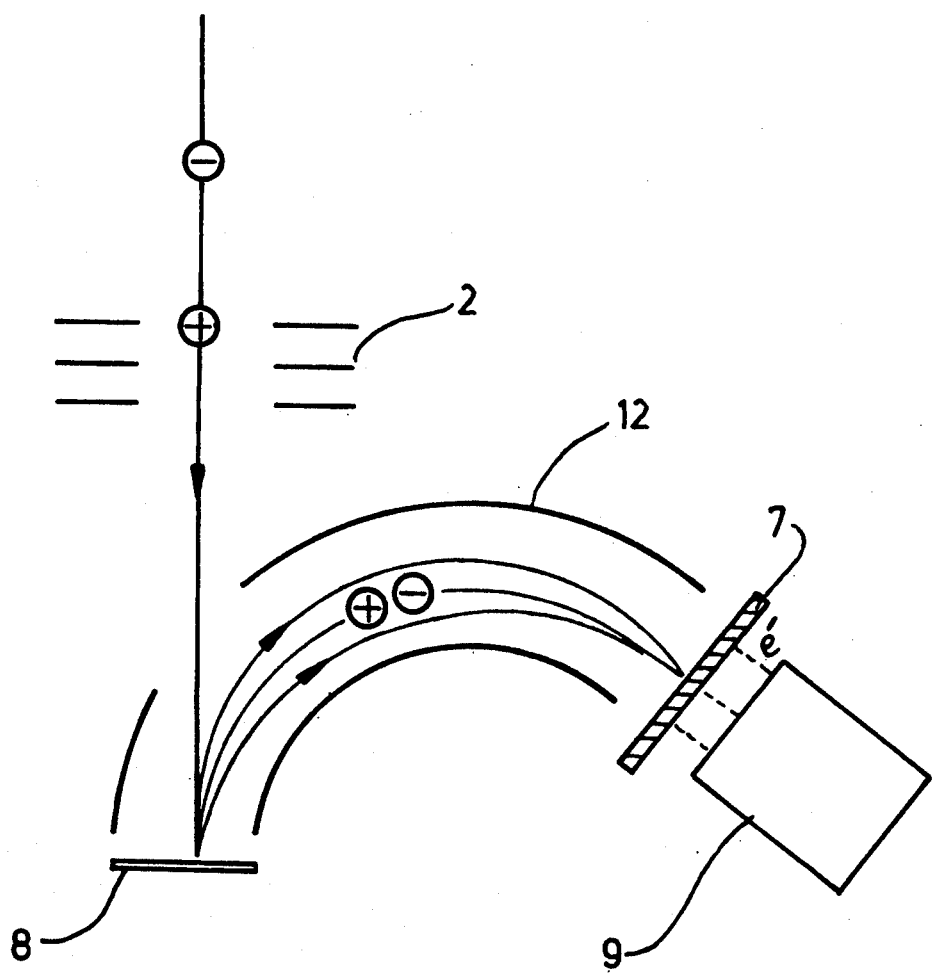
FIG. 3 shows a two-fold conversion dynode arrangement having an electrostatic sector as energy-dispersive element.

FIG. 3 shows a two-fold conversion dynode arrangement according to the invention having an electrostatic sector 12 as energy-dispersive element. Here, too, the positively and negatively charged ions of the primary beam impinge on the first conversion dynode 8, but are focused by the energy-dispersive element 12 onto the second conversion dynode 7, and generate there electrons which are specific for the particular ion and are accelerated in turn in a secondary electron multiplier, where with the aid of a scintillation counter they generate an electrical signal which is used to analyse the primary ions.

Figure 4:
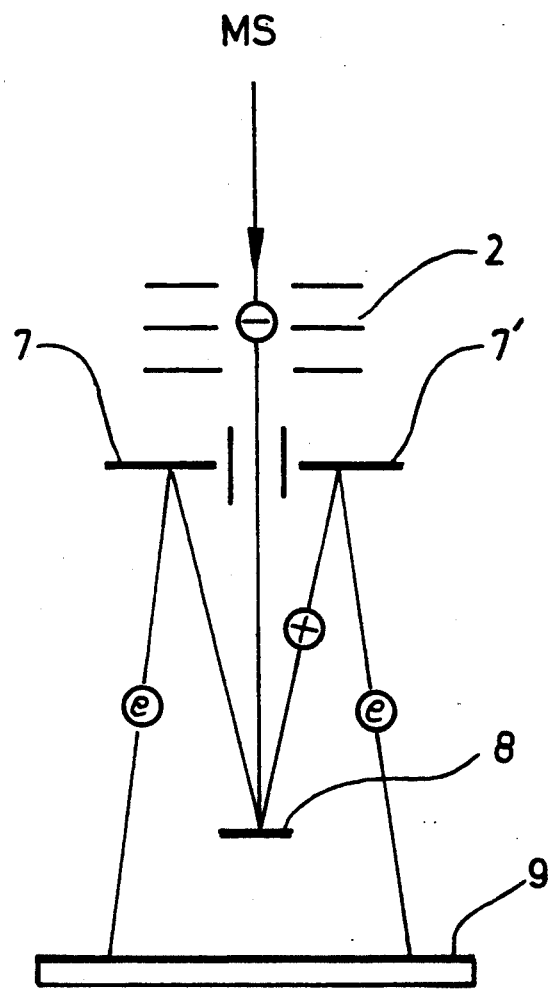
FIG. 4 shows a two-fold conversion dynode arrangement for negative primary ions/positive secondary ions without a mass-dispersive element.

A two-fold conversion dynode arrangement for negative primary and positive secondary ions without a mass-dispersive element is represented in FIG. 4 Exactly as in the arrangement according to FIG. 1, the ions flying out of the mass spectrometer enter an electric accelerating field of the focusing electrodes 2, and are directed there by further focusing measures onto the first conversion dynode 8. The positively and negatively charged ions generated in the backscatter then impinge on the second 7 and third 7' conversion dynode and generate there in the normal way electrons which, once again in backscatter, impinge on an analysing device 9, generate a signal and then further process this signal electronically in a known way.

It is possible by means of the embodiments set forth above of a detector device and of a method for analysing ions of high mass using a time-of-flight spectrometer substantially to enhance the detection sensitivity for this type of ion.

We claim:

1. A detector device for analyzing ions of high mass using a time-of-flight mass spectrometer (TOF) with a focusing device for primary ions which emerge from an ion source, comprising a conversion dynode for generating secondary ions from the primary ions, means for generating an electric or magnetic field, the secondary ions passing the electric or magnetic field and being selected according to mass, including means for stopping out certain mass ranges of the secondary ions, and means for detecting the selected secondary ions.

2. A detector device for analyzing ions of high mass using a time-of-flight mass spectrometer (TOF) with a focusing device for primary ions which emerge from an ion source, comprising a conversion dynode for generating secondary ions from the primary ions, means for generating an electric or magnetic field, the secondary ions passing the electric or magnetic field and being selected according to mass range, and a row detector or array detector for detecting the secondary ions which are selected according to their masses.

3. A method for analyzing ions of high mass using a time-of-flight mass spectrometer (TOF), with a conversion dynode for generating secondary ions from primary ions, comprising the following steps:
   a) selecting the secondary ions according to their mass in an electric or magnetic field after they have emerged from the conversion dynode,
   b) detecting said selected secondary ions.

4. A method for analyzing ions of high mass using a time-of-flight mass spectrometer (TOF), with a conversion dynode for generating secondary ions from primary ions, comprising the following steps:
   a) after emerging from the conversion dynode, selecting the secondary ions according to their mass range in an electric or magnetic field,
   b) detecting the secondary ions of different masses in a row or array detector.

* * * * *